(12) United States Patent
Chung

(10) Patent No.: US 7,567,608 B2
(45) Date of Patent: Jul. 28, 2009

(54) VOLUME BRAGG GRATING LASER MIRROR DEVICE

(75) Inventor: Te-Yuan Chung, Taoyuan (TW)

(73) Assignee: National Central University, Taoyuan (TW)

(*) Notice: Subject to any disclaimer, the term of this patent is extended or adjusted under 35 U.S.C. 154(b) by 0 days.

(21) Appl. No.: 11/902,078

(22) Filed: Sep. 18, 2007

(65) Prior Publication Data

US 2008/0187019 A1    Aug. 7, 2008

(51) Int. Cl.
*H01S 3/08* (2006.01)
(52) U.S. Cl. .......................... 372/102; 372/92; 372/98; 372/99
(58) Field of Classification Search .................. 372/92, 372/93, 98–99, 102
See application file for complete search history.

(56) References Cited

U.S. PATENT DOCUMENTS

| | | | | |
|---|---|---|---|---|
| 6,673,497 | B2 * | 1/2004 | Efimov et al. | 430/1 |
| 7,248,618 | B2 * | 7/2007 | Volodin et al. | 372/102 |
| 7,450,626 | B1 * | 11/2008 | Bass et al. | 372/102 |
| 2005/0207466 | A1 * | 9/2005 | Glebov et al. | 372/92 |
| 2007/0147444 | A1 * | 6/2007 | Kim | 372/22 |
| 2008/0031289 | A1 * | 2/2008 | Cho et al. | 372/22 |
| 2008/0080585 | A1 * | 4/2008 | Glebov et al. | 372/102 |

FOREIGN PATENT DOCUMENTS

JP        2007171552 A   *   7/2007

* cited by examiner

*Primary Examiner*—Minsun Harvey
*Assistant Examiner*—Phillip Nguyen

(57) ABSTRACT

A volume Bragg grating (VBG) has a narrow wavelength. The wavelength is changed by changing an angle of the VBG or a temperature of the VBG. Thus, the present invention has a narrow wavelength, a bright laser, a simple system and an adjustable reflection for a wide application to laser systems.

7 Claims, 19 Drawing Sheets

VOLUME BRAGG GRATING LASER MIRROR DEVICE

FIELD OF THE INVENTION

The present invention relates to a volume Bragg grating; more particularly, relates to obtaining a wavelength of an output laser and a narrow laser output spectrum width.

DESCRIPTION OF THE RELATED ARTS

Using Bragg grating as a laser reflector is not a new idea. There are several patents as prior arts. Some fiber Bragg gratings are used to stabilize outputs of diode lasers in U.S. Pat. Nos. 6,125,222, 6,044,093 and 5,717,804. A fiber grating is used in fiber laser in U.S. Pat. No. 6,018,534. A vertical-cavity surface-emitting laser (VCSEL) obtained through epitaxy obtains films as Bragg gratings through various epitaxies for reflecting in U.S. Pat. No. 4,943,970. Some Bragg gratings are obtained on a surface through micro-lithography in U.S. Pat. Nos. 5,289,494 and 5,022,042. In the above prior arts, most are diode lasers and only few use other gain media. An example is U.S. Pat. No. 5,796,764, which use $Nd:LiNbO_3$ as the gain medium. Yet Bragg grating it used is only a fiber grating.

In the above patents, the Bragg gratings are waveguides and are emitted perpendicularly. However, they are too simple and are not flexible. Nor are they applied to integrated laser systems, like the most commonly used Nd:YAG laser system. Hence, the prior arts do not fulfill all users' requests on actual use.

SUMMARY OF THE INVENTION

The main purpose of the present invention is to obtain a wavelength of an output laser and a narrow laser output spectrum width for improving characteristics of a laser with a simple design and a low cost to be widely applied in various lasers.

To achieve the above purpose, the present invention is a volume Bragg grating (VBG) laser mirror device, where a VBG having PTR glasses is obtained as a laser reflector for narrowing a wavelength of an output laser and for changing an output laser wave length by changing the VBG's angle; the PTR glass has a high damage threshold and a high refraction coefficient; and the PTR glass can have a big size to be applied to components for narrowing spectrum and tuning output wavelength in a laser chamber; or, where the output laser wavelength is changed by changing temperature of the VBG through putting the VBG in a temperature controlled oven. Accordingly, a novel volume Bragg grating laser mirror device is obtained.

BRIEF DESCRIPTION OF THE DRAWINGS

The present invention will be better understood from the following detailed descriptions of the preferred embodiments according to the present invention, taken in conjunction with the accompanying drawings, in which.

DESCRIPTIONS OF THE PREFERRED EMBODIMENTS

The following descriptions of the preferred embodiments are provided to understand the features and the structures of the present invention.

Figure 1:
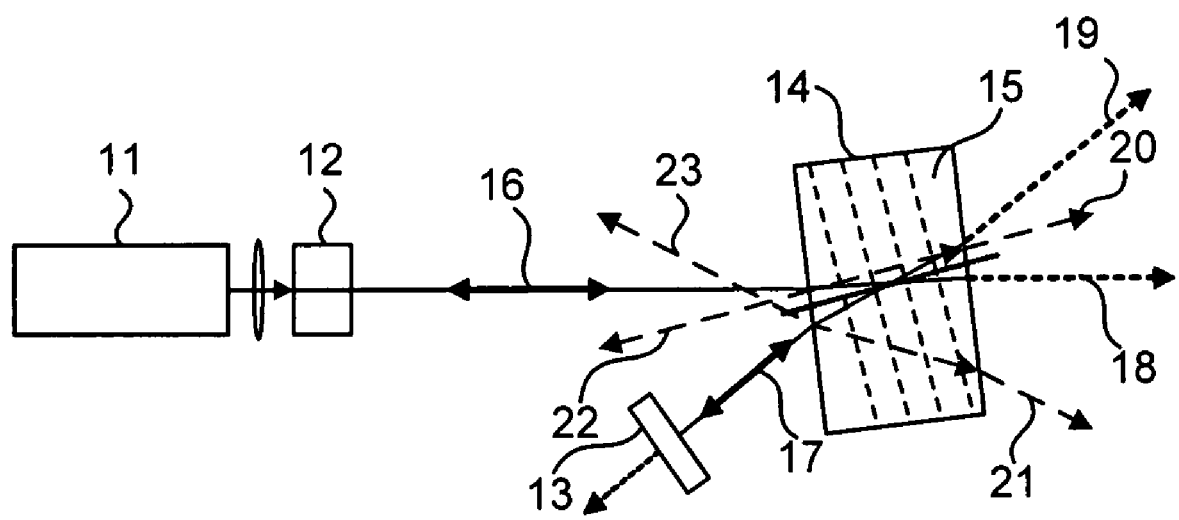
FIG. 1 is the view showing the first preferred embodiment according to the present invention.

Please refer to FIG. 1, which is a view showing a first preferred embodiment according to the present invention. As shown in the figure, the present invention is a volume Bragg grating laser mirror device, comprising a 808 nanometer (nm) diode laser pump 11; a first reflector 12 doped with laser crystal; a second reflector 13; and a volume Bragg grating (VBG) 14 having a medium of photo-thermal refractive (PTR) glasses 14, where the first reflector 12 is further doped with a crystal of neodymium doped gadolinium vanadate ($Nd:GdVO_4$) and is coated with a reflective film, or together with a transmissive film; the second reflector 13 is coated with a highly reflective film reflecting a 1064 nm (nanometer) wavelength and has a ~99.7% reflection coefficient; the second reflector 13 is further doped with a crystal of neodymium doped yttrium aluminum garnet (Nd:YAG); the VBG 14 has advantages on a high damage threshold, a high index variation and a high grating size; and an output wavelength of a laser is changed by adjusting angles of the second reflector 13 and the VBG 14 simultaneously.

On using the present invention, a laser from the 808 nm diode laser pump 11 is emitted through the first reflector 12 to a VBG surface 15 and to the PTR glasses in the VBG 14 with a 2.7 degrees (°) incident angle or a 8.1° diffraction angle. In a V-type resonant cavity, the VBG 14 has the lowest reflection. Hence, an output laser has a 4.0° deviation and most part of the power is gathered at the VBG 14. By simultaneously changing the angles of the VBG 14 and the second reflector 13, two main output light beams are obtained, which are a third light beam 18 and a fourth light beam 19, together with other four output light beams of a fifth light beam 20, a sixth light beam 21, a seventh light beam 22 and an eighth light beam 23. Because the intra-cavity laser power is quite big, an anti-reflective film is coated on a surface of the VBG 14 to reflect the laser from the first reflector 12 to the V-type resonant cavity. The reflected light beams have a certain amount of power, which are a first light beam 16 and a second light beam 17. And owing to different angles of the first light beam 16 and the second light beam 17 reflections of the corresponding anti-reflective films on the surfaces of the PTR glasses are different. An output power ratio of the third light beam 18, the fourth light beam 19, the fifth light beam 20, the sixth light beam 21 and the eighth light beam 23 is about 1.00:0.96:0.04:0.07:0.04 at a total output power of 1 watt (W). Thus, with various light beam powers, different reflections of the PTR glasses and the VBG are obtained. Moreover, the intra-cavity power is obtained from the output light beam of the second reflector 13. Therein, the V-type resonant cavity has a length of 23.5 centimeter.

Figure 2:
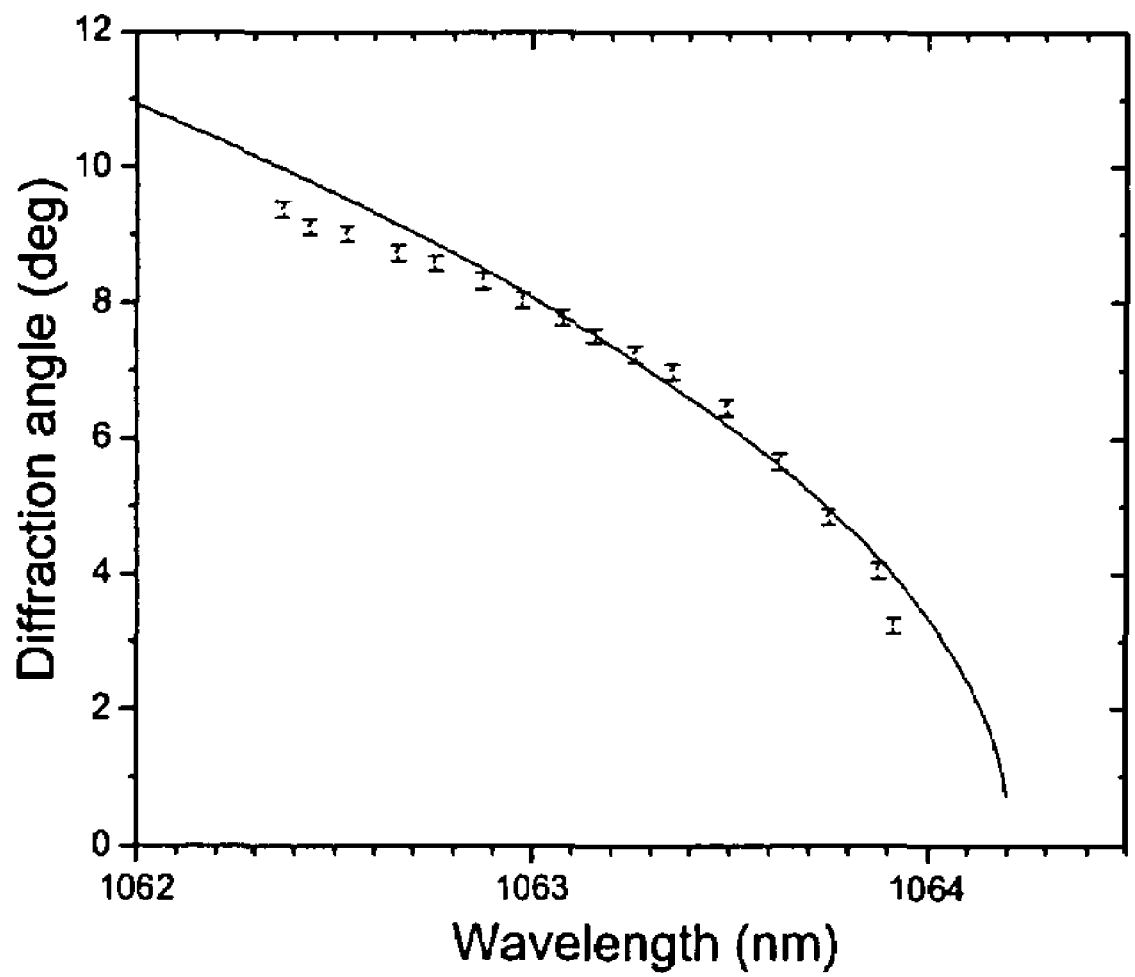
FIG. 2 is the view showing the relationship between the diffraction angle and the laser wavelength cross section.

Please further refer to FIG. 2, which is a view showing a relationship between the diffraction angle and the laser wavelength cross section. As shown in the figure, at a pump power lower than 4 W, a laser is operated in a single-longitudinal mode. To ensure the laser mode composition, a scanning Fabry-Perot cavity is used to monitor one of the light beams. At the meantime, the laser wavelength is measured by a Burleigh WA-1000 wave meter which has accuracy about 0.001 nm. By changing angles of the VBG 14 and the second reflector 13 simultaneously, the laser output wavelength is tuned across a gain profile of a corresponding emission line of Nd:GdVO$_4$. A continuous wavelength is tuned over 2 nm which corresponds to 6.5° angle change of the VBG 14 used. Thus, a solid line derived from Bragg condition and Snell's law agrees reasonably well with measured data and a calculated central wavelength of the VBG 14 is 1064.21 nm, which is conformed to an expected output.

Figure 3:
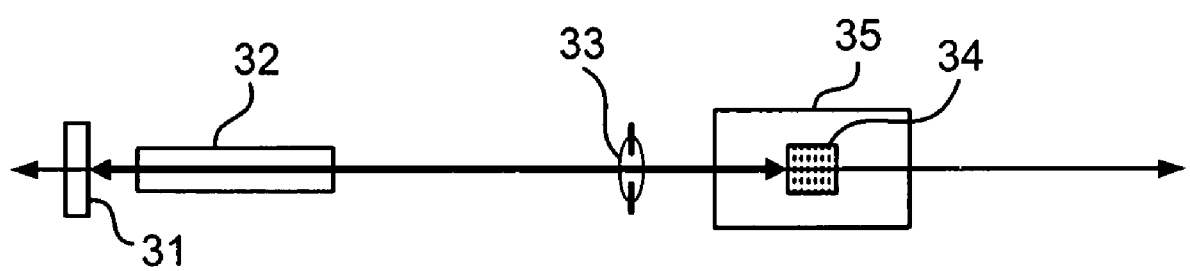
FIG. 3 is the view showing the second preferred embodiment.

Please refer to FIG. 3, which is a view showing a second preferred embodiment. As shown in the figure, the present invention is a volume Bragg grating laser mirror device, comprising a first reflector 31, a second reflector 32, a resonant cavity 33, a VBG 34 and a temperature controlled furnace 35, where the first reflector 31 is coated with a highly reflective film having a 1064 nm refraction coefficient; the resonant cavity 33 is an n-type resonant cavity, which can be a linear-type, V-type or circle-type resonant cavity; by controlling a reflective wavelength of the VBG 34 through a thermal modulation of the temperature controlled furnace 35, a central wavelength of an output laser is changed; and the thermal modulation is obtained through a thermal expansion coefficient of the VBG 34.

Figure 4:
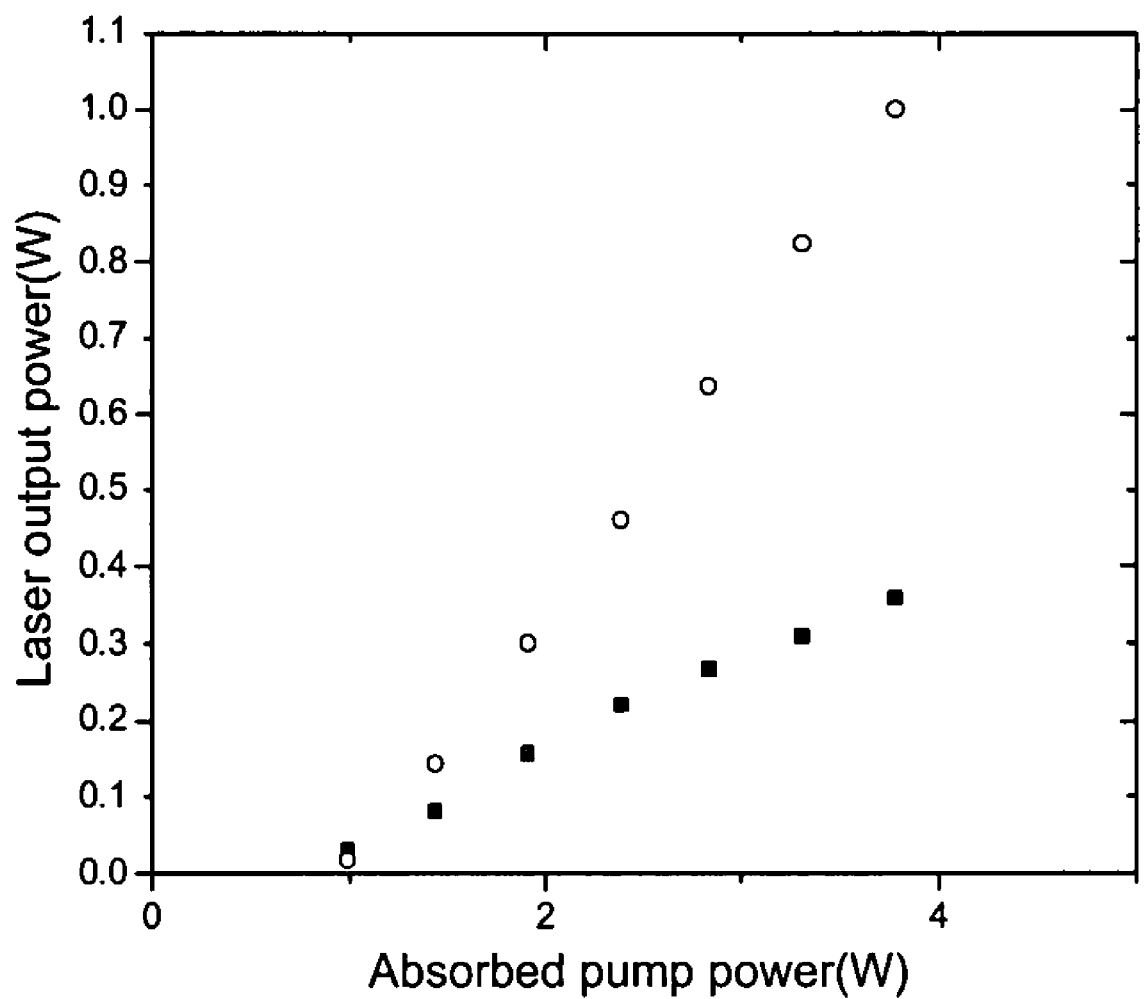
FIG. 4 is the view showing the relationship between $Nd:GdVO_4$ laser output power and pump power.

Please refer to FIG. 4, which is a view showing a relationship between Nd:GdVO4 laser output power and pump power. As shown in the figure, a linear cavity laser with the same length of an n-type resonant cavity is set up using a second reflector having the same height without VBG inside the cavity for comparison. Therein, the solid square 41 indicates output laser powers versus pump power for a linear-type resonant cavity, while the open circle 42 indicates those for a V-type resonant cavity.

The total output of the V-cavity laser setup (as shown in FIG. 1) has a maximum output power at an output wavelength about 1063.14 nm. A formula for relationship between laser output power Pout(vL) and threshold power Pth(vL) can be written as $$P_{out}(v_L) = \left(\frac{-\ln R}{\delta - \ln R}\right)\eta\left[P_{in} - \left(\frac{\delta - \ln R}{2}\right)\frac{Ahv_L}{\eta\sigma(v_L)\tau_f}\right] = \sigma_s[P_{in} - P_{th}(v_L)]$$

Formula (1)

where "R" is an output coupler's reflectivity; "$\delta$" is an additional intra-cavity losses; "$\eta$" is a combined internal and external efficiency of a laser; "A" is an area of a laser crystal cross section; "$hv_L$" is a laser photon energy; "$\sigma(v_L)$" is an emission cross section at different laser wavelength; "$\sigma_s$" is a slope efficiency; and "$\tau_f$" is a fluoresces lifetime. Since the linear-type and V-type resonant cavity have the same parameters except the reflectivity and additional intra-cavity loss, reflectivity of the VBG and additional intra-cavity loss of the V-type resonant cavity are calculated through Formula (1). It is assumed that an additional loss of the linear-type resonant cavity is about 2%. Thus, a calculated reflectivity of the VBG is 99.7%; an anti-reflective film of a PTR glass surface at different incident angles have reflectivities of 0.12% and 0.18% when the laser wavelength is at 1063.14 nm; and, additional intra-cavity loss of the V-type resonant cavity is also about 2% which implies that the VBG does not introduce significant loss.

In a tuning range of an emission line, the photon energy only has a negligible 0.1% change. While the emitting lasing wavelength is angularly tuned, most parameters remain unchanged in both the linear-type and the V-type resonant cavities except the emission cross section. Therefore, the emission cross section of the corresponding wavelength can be calculated from Pth(vL) using Formula (1).

Figure 5:
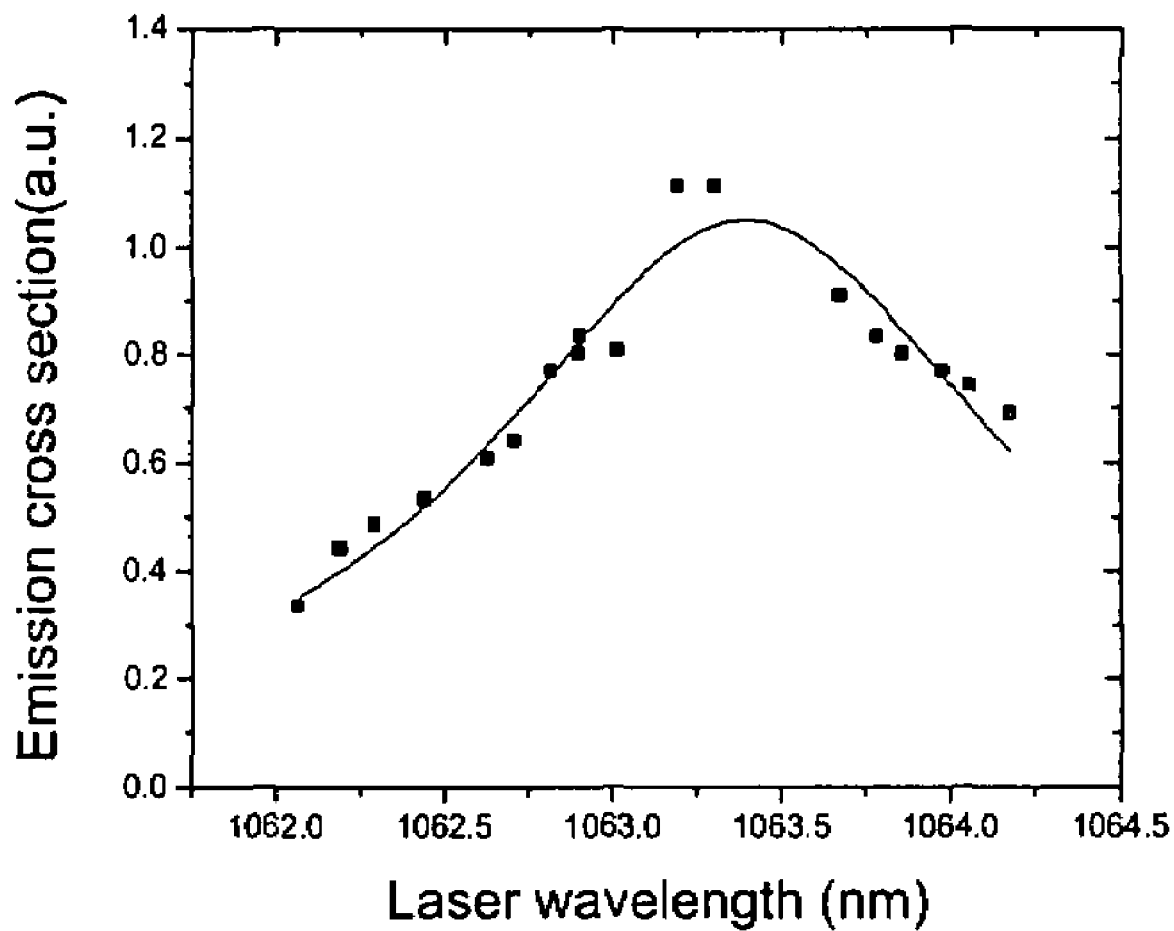
FIG. 5 is the Lorentzian function view showing the relationship between $Nd:GdVO_4$ radiation reaction section and wavelength.

Please refer to FIG. 5, which is a Lorentzian function view showing a relationship between Nd:GdVO4 radiation reaction section and wavelength. As shown in the figure, a VBG is used as a laser reflector in a V-type resonant cavity. The VBG is not only a cavity reflector but a wavelength selection and spectral narrowing element. The wavelength of the laser output is precisely tuned virtually over the whole gain bandwidth by changing the angle of the VBG and that of an end reflector simultaneously. Single longitudinal mode operation is also achieved without any extra intra-cavity element. The gain profile of Nd:GdVO$_4$ at 1063.39 nm emission line with FWHM 1.88 nm is also obtained.

Please refer to FIG. 6 to FIG. 17, which are a view showing a reflection spectrum of the VBG; views showing a linear-type and a V-type VBG laser chambers; views showing a first and a second single angle-tunable VBG laser chamber; views showing a laser chamber having dual VBGs and that having V-type VBG and linear-type VBG; views showing a first, a second, a third and a fourth circle-type VBG laser chambers; and a view showing different VBG laser reflectors. As shown in the figures, VBGs are used as laser mirrors, as are served in various laser systems regardless gain medium types. The gain media are any available materials so long as emission wavelengths of the gain media satisfy the Bragg conditions of the VBGs. Cavities are designed to be directly applied to practical laser systems. When a laser system is designed and constructed the VBG only need to be considered as a narrow reflection spectrum plane mirror.

Figure 6:
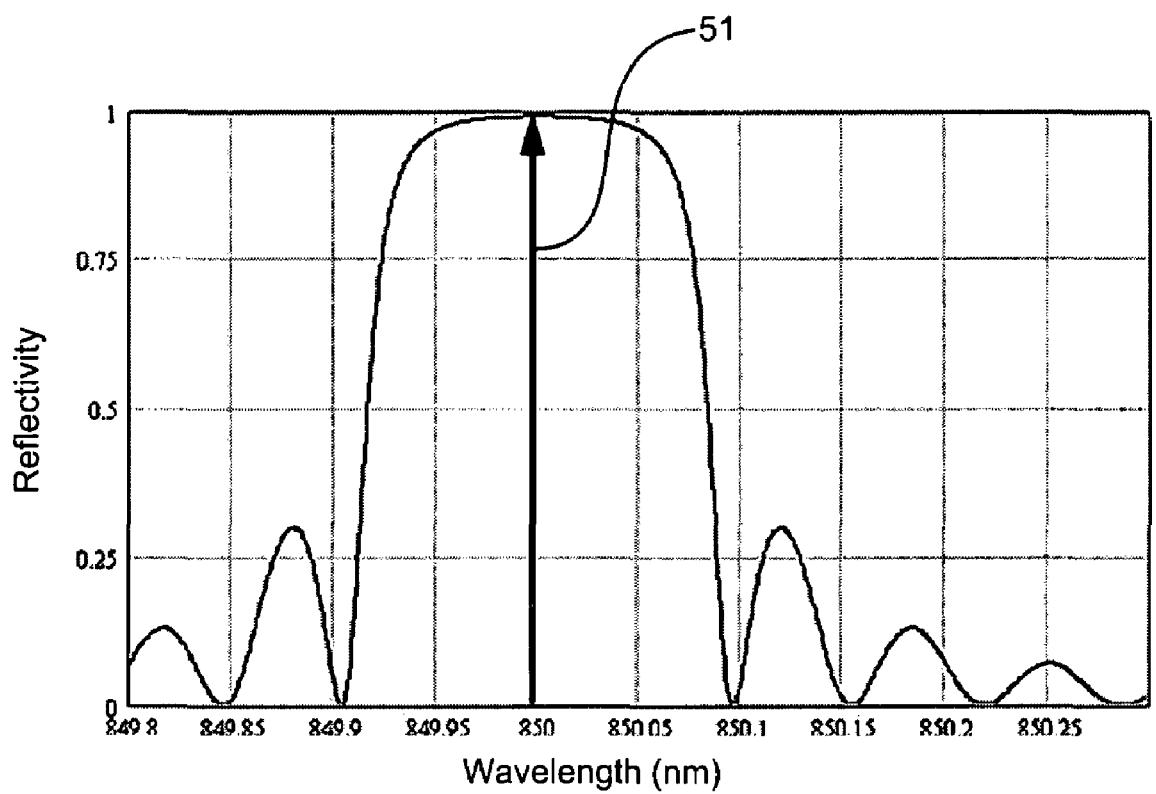
FIG. 6 is the view showing the reflection spectrum of the VBG.

As shown in FIG. 6, a reflection spectrum of a normal VBG has a FWHM less than 200 pm (picometer) and a central reflection wavelength about 850 nm. A central reflection wavelength is changed on fabricating the VBG. On using such a VBG as a laser mirror in a laser cavity, an output laser has a wavelength located at the central reflection wavelength, and a 99% reflection rate is obtained. Thus, the laser wavelength is stabilized at the central reflection wavelength by using a laser chamber of the VBG coordinated with a reflector.

Figure 7:
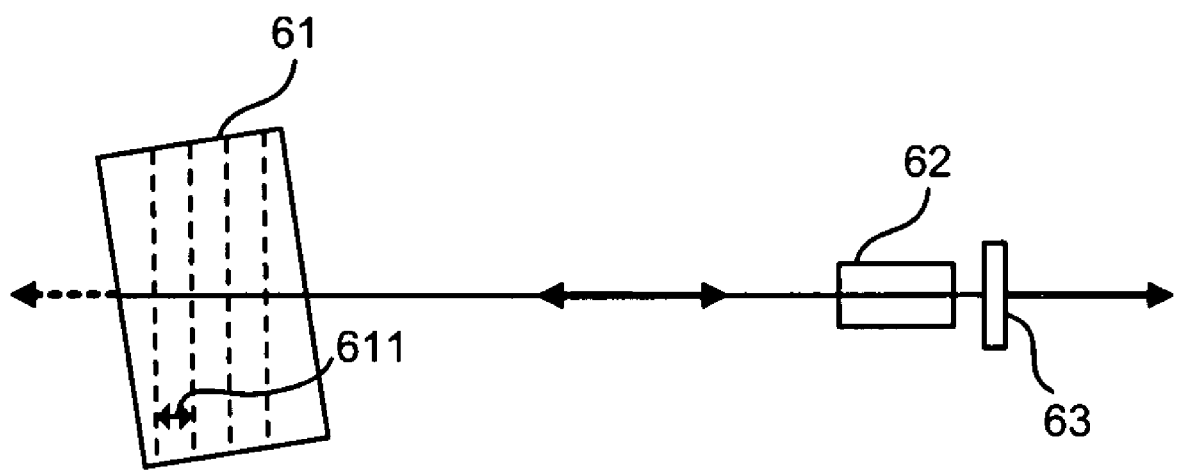
FIG. 7 is the view showing the linear-type VBG laser chamber.

As shown in FIG. 7, a laser output wavelength is tuned by changing a spacing 611 in a VBG 61 while coordinated with a first reflector 62 and a second reflector 63.

Figure 8:
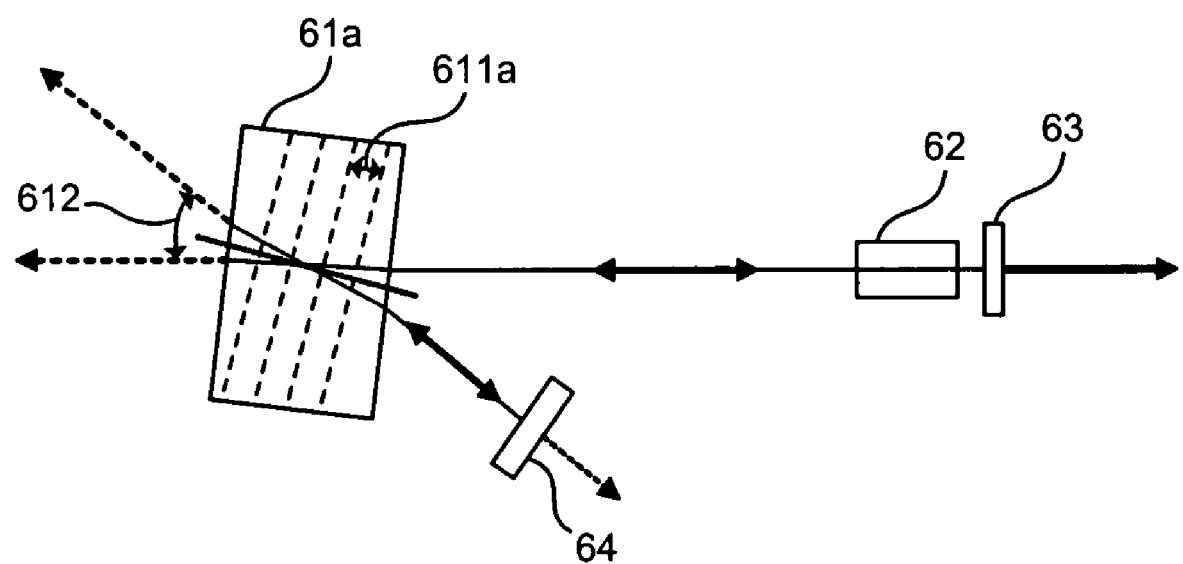
FIG. 8 is the view showing the V-type VBG laser chamber.

As shown in FIG. 8, a laser output wavelength is tuned by changing an angle of a VBG 61a and a spacing 611a in the VBG 61a while coordinated with the first reflector 62, the second reflector 63 and a third reflector 64.

Figure 9:
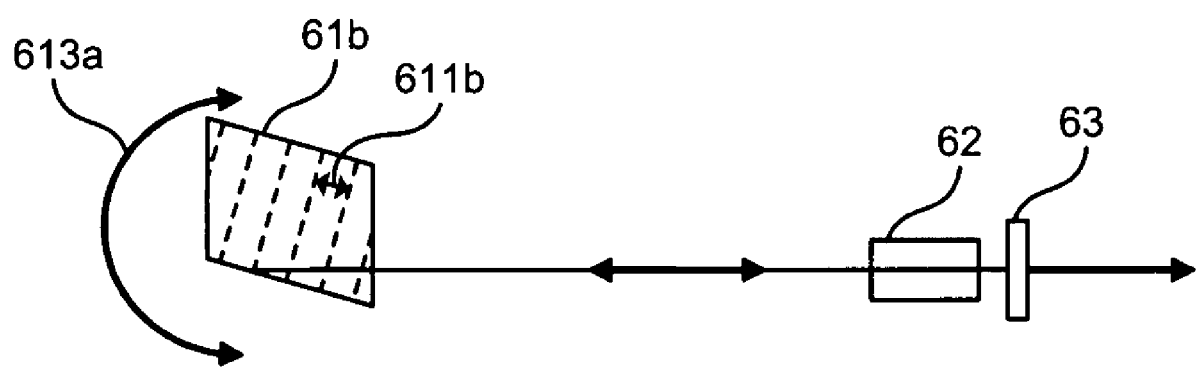
FIG. 9 is the view showing the first single angle-tunable VBG laser chamber.

As shown in FIG. 9, a total internal reflection is used to feedback a laser cavity. Bragg reflection surfaces inside a VBG 61b are perpendicular to the VBG 61b surface. The laser output wavelength is tuned by changing an angle of the VBG 61b and a spacing 611b of the VBG 61b while coordinated with the first reflector 62 and the second reflector 63.

Figure 10:
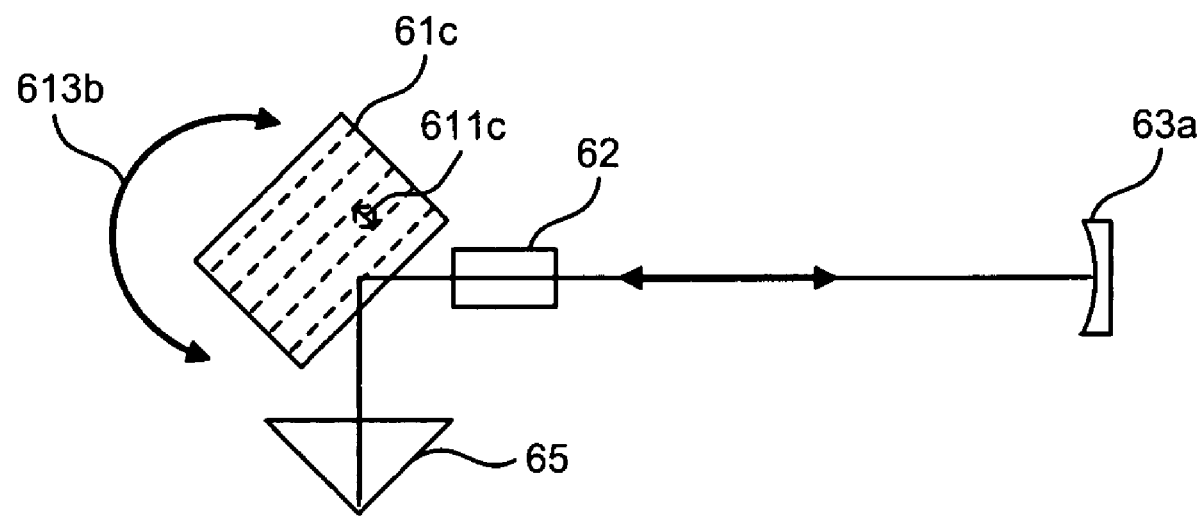
FIG. 10 is the view showing the second single angle-tunable VBG laser chamber.

As shown in FIG. 10, a retro-reflection prism 65 is utilized to ensure that incident and reflection lights are parallel. A laser output wavelength is tuned by changing an angle 613b of a VBG 61c and a spacing 611c of the VBG 61c while coordinated with the first reflector 62 and a concave reflector 66.

Figure 11:
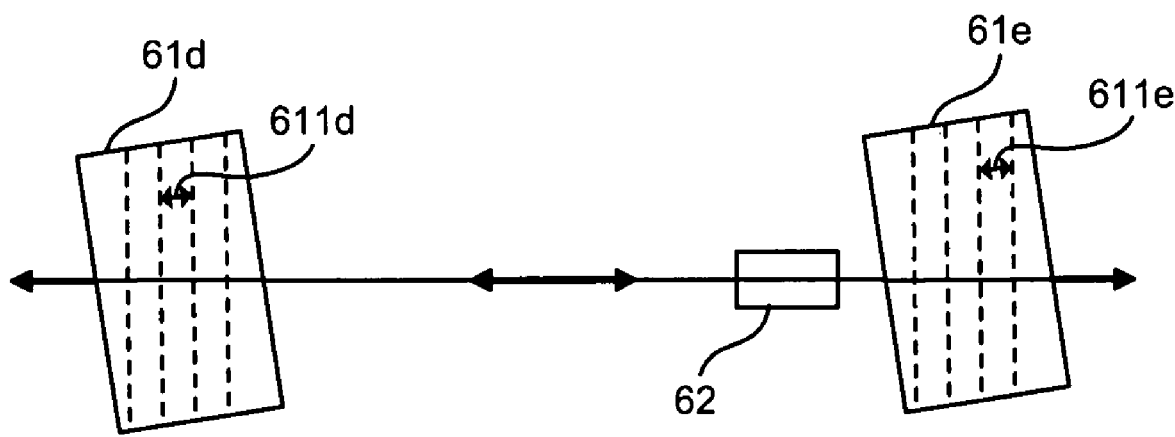
FIG. 11 is the view showing the laser chamber having dual VBGs.
Figure 18:
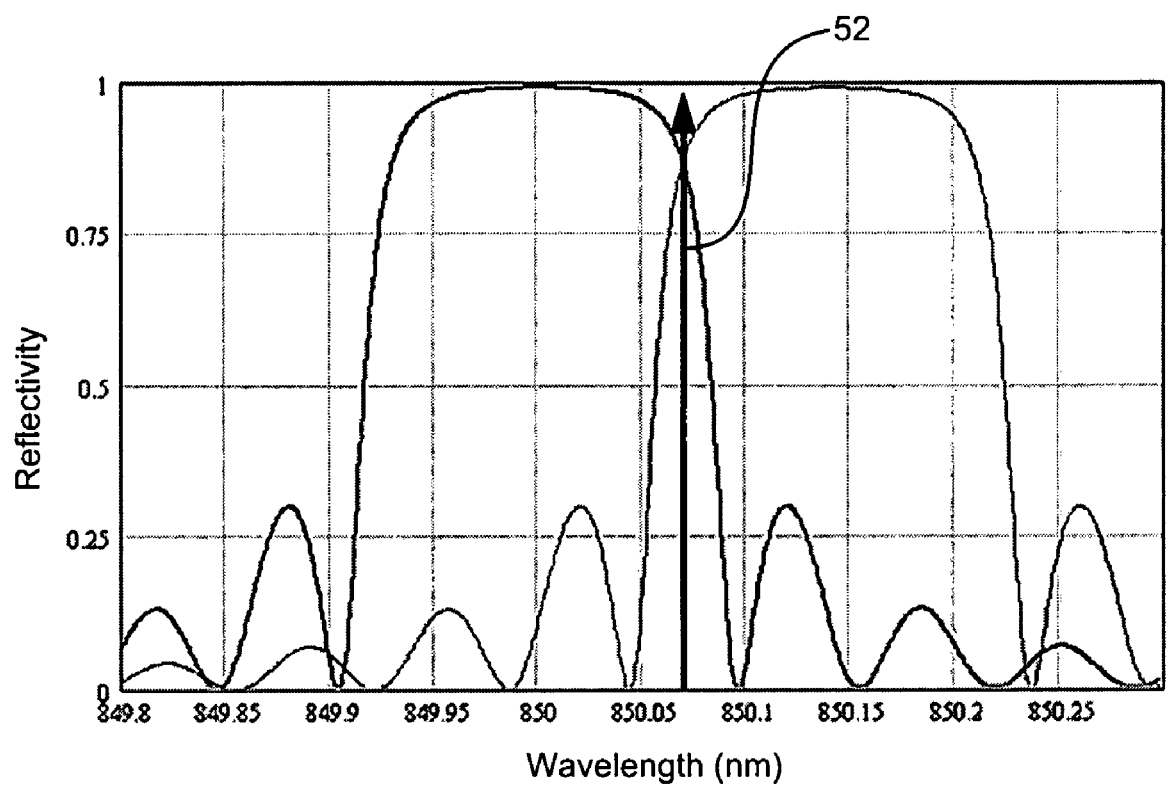
FIG. 18 is the view showing the spectrums of the two VBGs.
Figure 19:
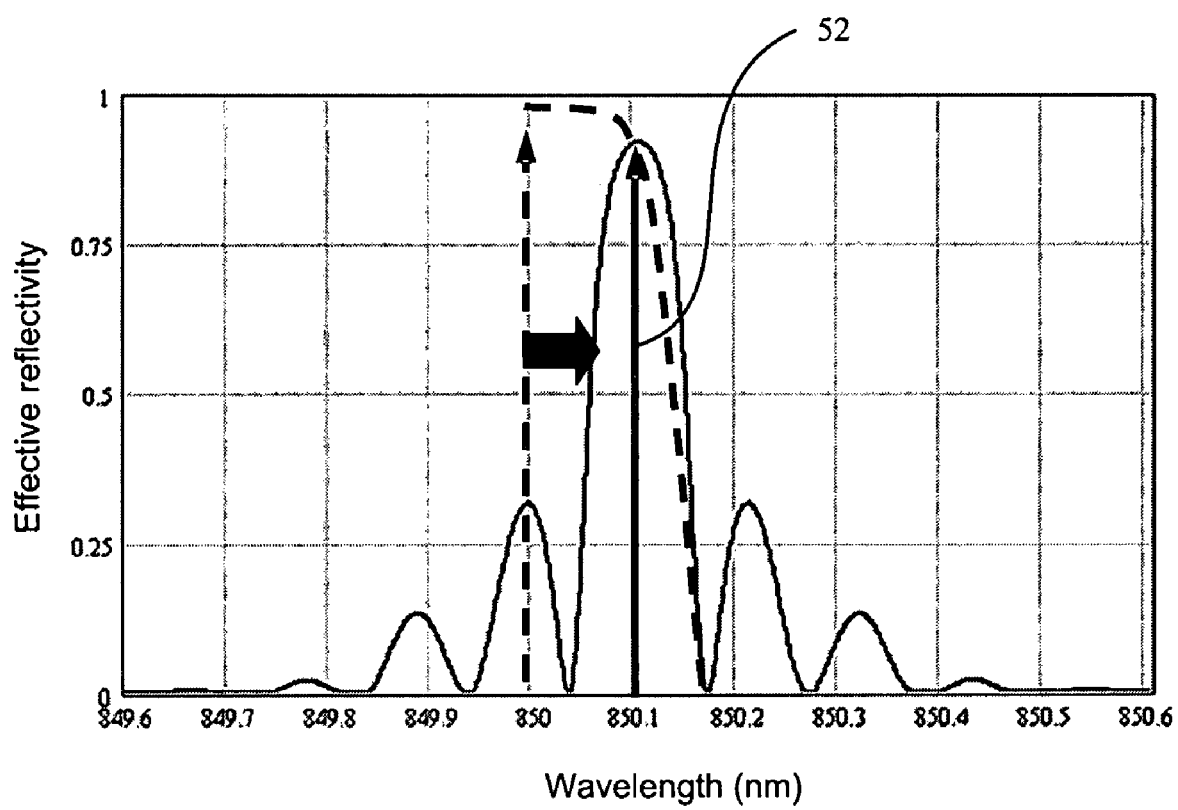
FIG. 19 is the view showing the wavelength shift of VBG spectrum reflection center.

As shown in FIG. 11, both VBGs 61d,61e work as laser mirrors. An effective reflectivity and a laser output wavelength (as shown in FIG. 18 and FIG. 19) is tuned by slightly mismatching VBG reflection spectra through changing spacings 611d,611e of VBGs 61d,61e while coordinated with the first reflector 62.

Figure 12:
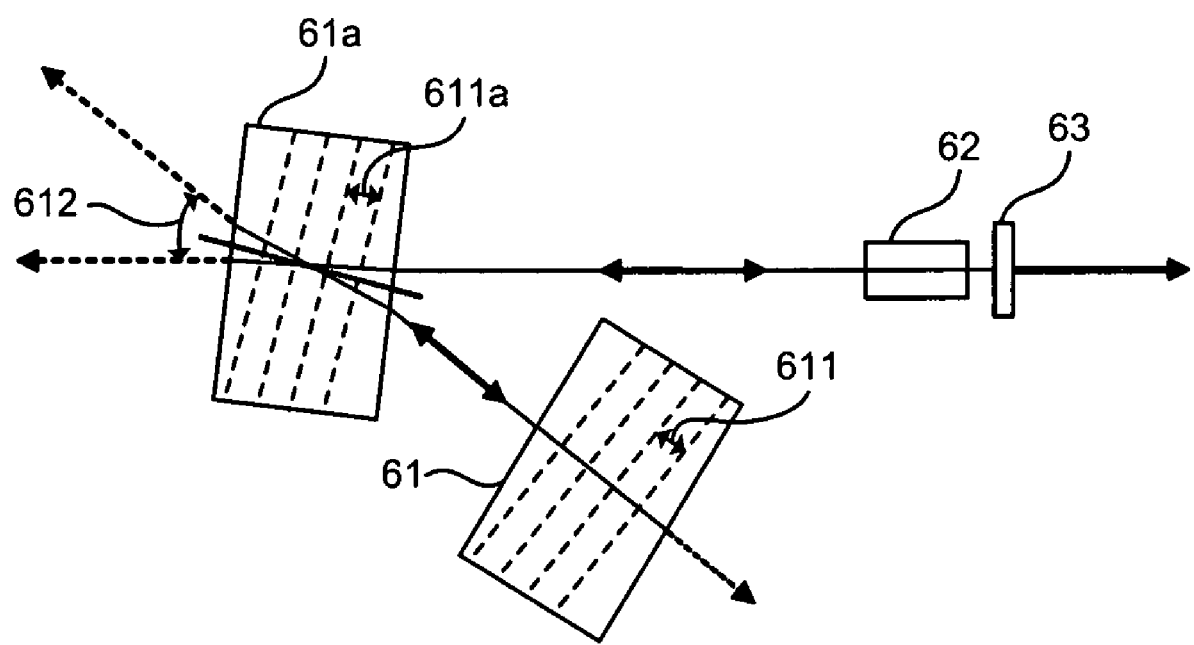
FIG. 12 is the view showing the laser chamber having the V-type VBG and the linear-type VBG.
Figure 13:
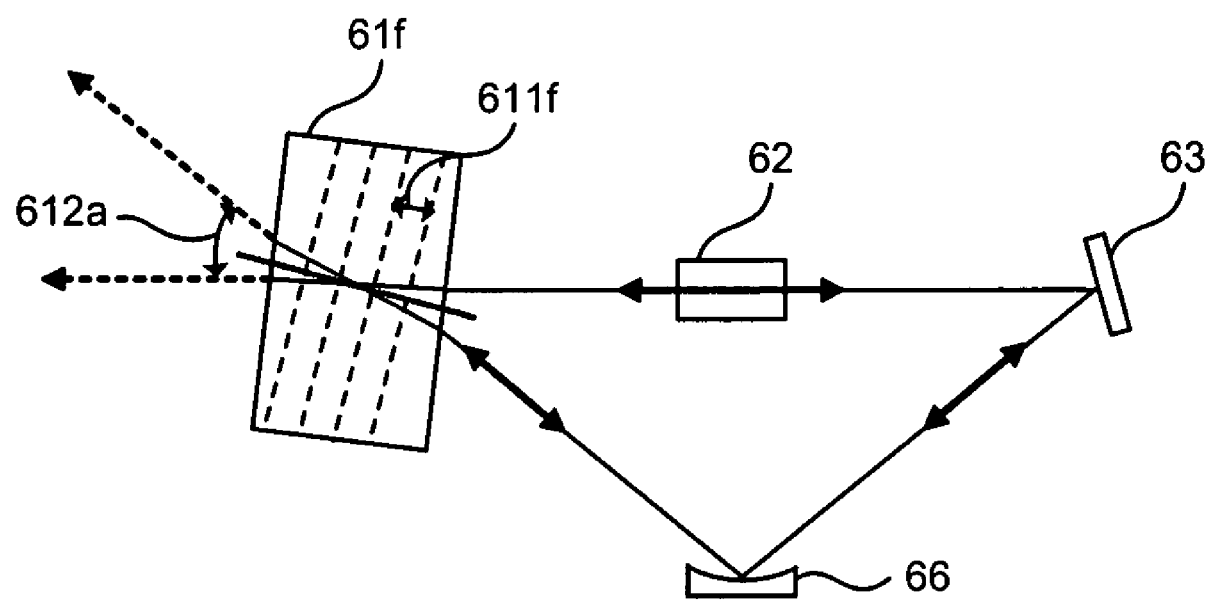
FIG. 13 is the view showing the first circle-type VBG laser chamber.
Figure 14:
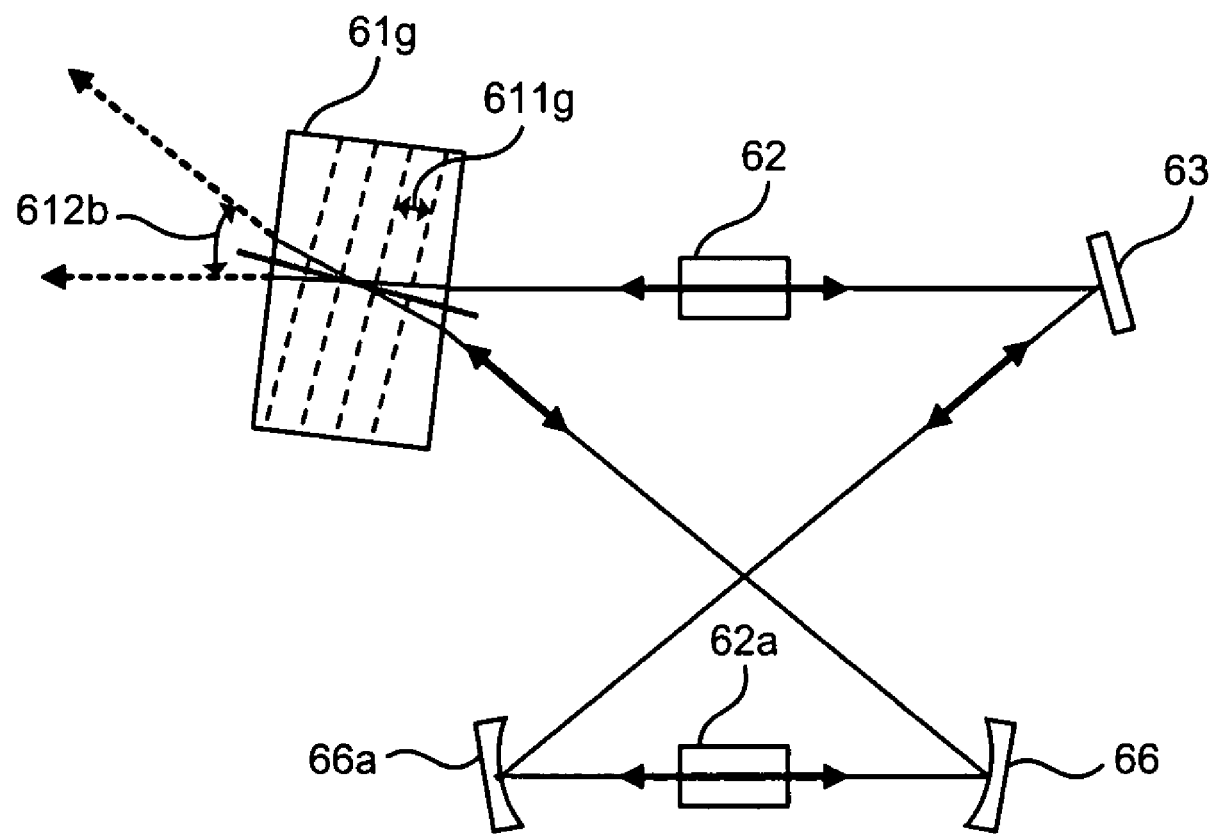
FIG. 14 is the view showing the second circle-type VBG laser chamber.
Figure 15:
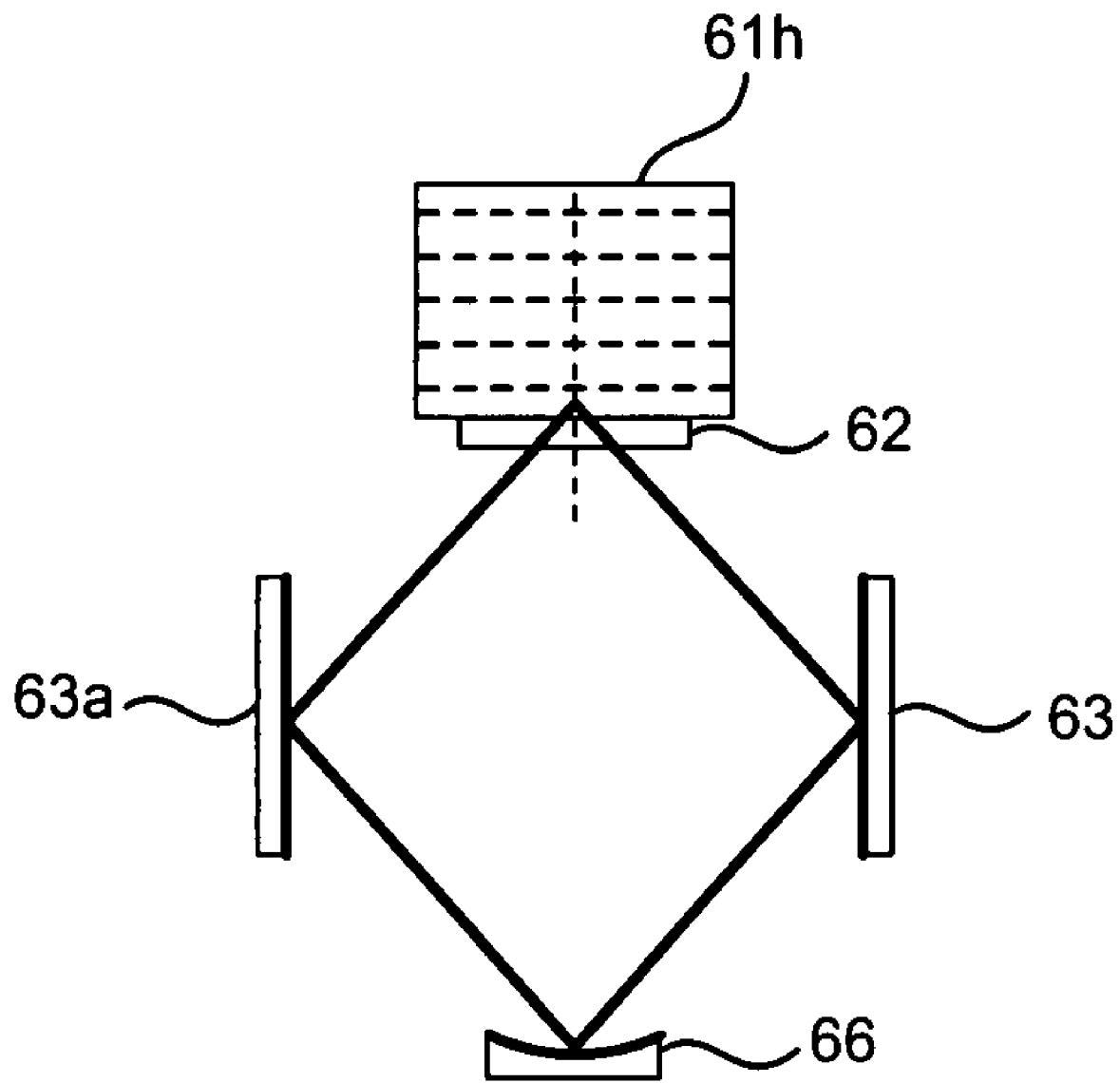
FIG. 15 is the view showing the third circle-type VBG laser chamber.
Figure 16:
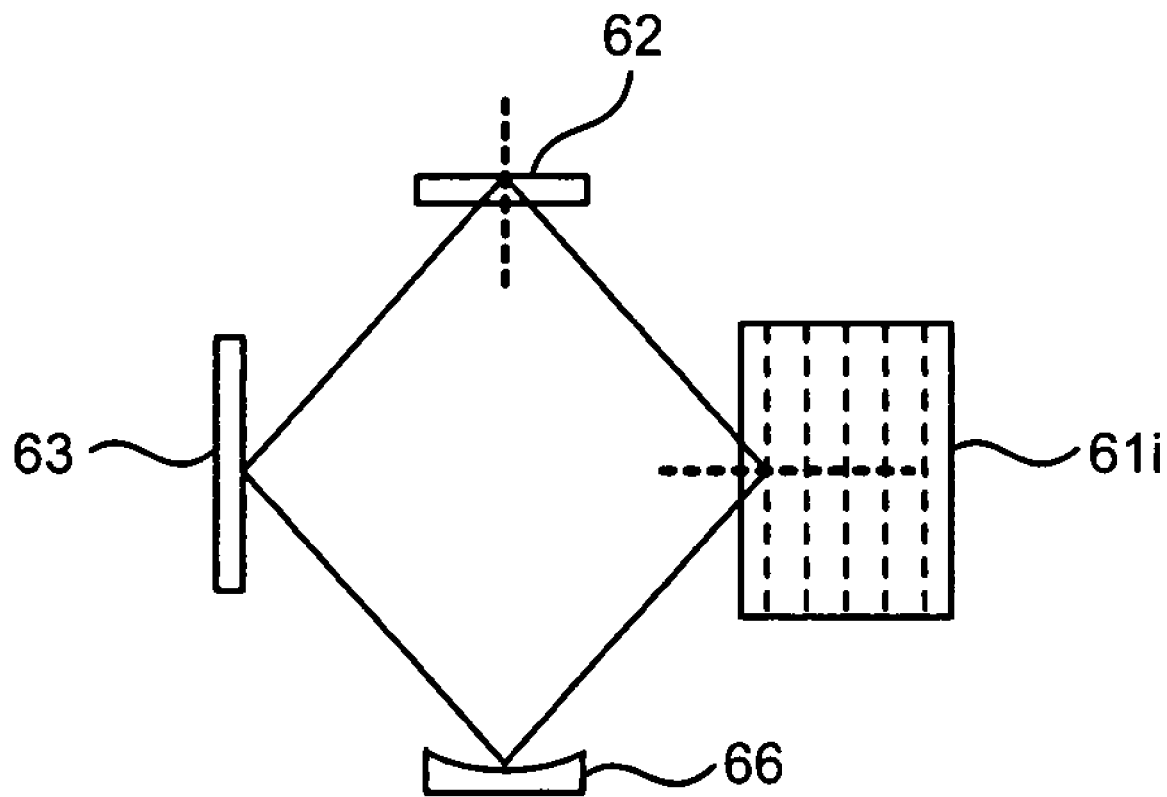
FIG. 16 is the view showing the fourth circle-type VBG laser chamber.

As shown in FIG. 12, combining V-type and linear-type resonant cavity makes tuning effective reflectivity and laser output wavelength possible by changing an angle 612 of the VBG 61,61a and the spacings 611,611a in the VBGs 61,61a while coordinated with the first reflector 62 and the second reflector 63

As shown in FIG. 13 to FIG. 16, effective reflectivity and laser output wavelengths of VBGs 61f,61g,61h,61i are tuned with the first reflector 62,62a, the second reflector 63,63a and the concave reflector 66,66a by changing spacings 611f,611g in the VBGs 61f,61g, where the reflectors are circled to form a laser chamber.

Figure 17:
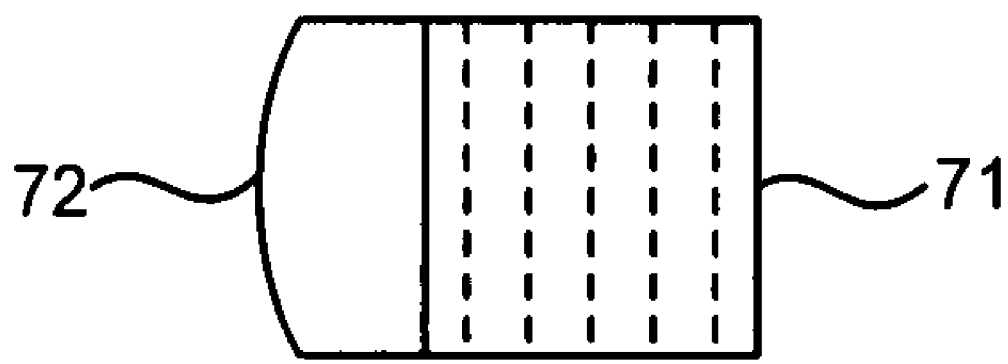
FIG. 17 is the view showing the different VBG laser reflectors.
Figure 17:
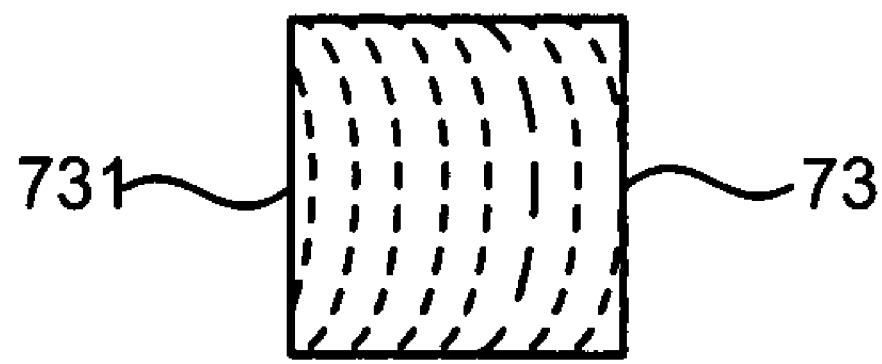
Figure 17:
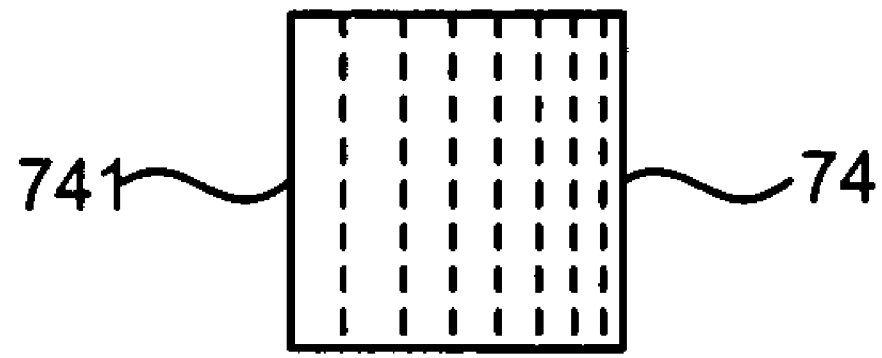

As shown in FIG. 17, on designing a laser reflector of a VBG, a typical VBG 71 is adhered with a convex lens 72 to work as a narrow reflection spectrum concave reflection mirror. Or, a VBG 73 having curved Bragg reflection surfaces 731 is worked as a narrow reflection spectrum concave reflection mirror. Or, a VBG 74 having uneven-spacing Bragg reflection surfaces is used to compress or stretch a mode-locked laser pulse.

Please further refer to FIG. 18 and FIG. 19, which are a view showing spectrums of two VBGs; and a view showing a wavelength shift of VBG spectrum reflection center. As shown in the figures, in a laser chamber using two same VBGs, changing a Bragg grating spacing of one of the two VBGs makes a laser output move to the middle of the two reflection wavelengths of these two VBGs. And the effective reflectivity is also changed to the product of the crossing points of these two same VBGs. Thus, the reflectivity is effectively changed.

Take a VBG having PTR glasses as an example. A Bragg grating spacing of the VBG is adjusted by changing temperature. It is assumed that the temperature has a changed value ($\Delta T$) where the VBG central spectrum wavelength ($\lambda 0$) is thus changed at a rate (k). Therefore, for two same VBGs, with a temperature change between them, a formula of the effective reflection is written as follows:

$$R_{\it{eff}}(\Delta T) = \left[ R\left(\Delta T \frac{k}{2} + \lambda_0\right) \right]^2$$

Hence, a laser resonant cavity having an adjustable reflection is obtained to control an output power and energy of an output laser. And an effective reflection of the laser resonant cavity is adjusted to obtain a best output according to different characteristic of the laser resonant cavity.

If a VBG reflector for a laser is designed as a V-type resonant cavity, a reflective wavelength can also be changed by changing the VBG reflector's angle while coordinated with another VBG reflector. Furthermore, because spectrums of the two VBG reflectors do not overlap, the mechanism for effectively changing reflection can be applied to other systems whose reflection are changeable to wavelength or angle. Thus, an adjustable laser resonant cavity is designed to effectively change a reflection of the laser resonant cavity through changing a relationship between reflection and wavelength; and such a design can be applied to different laser systems.

To sum up, the present invention is a volume Bragg grating laser mirror device, where an output wavelength is changed through changing angles of a VBG and a second reflector; or the output wavelength is changed through controlling a temperature of the VBG; and, thus, a narrow laser spectrum width is obtained with an adjustable reflective wavelength.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A volume Bragg grating laser mirror device, comprising:
   a first reflector;
   a second reflector;
   a resonant cavity, a light source passing through said resonant cavity from said first reflector and said second reflector;
   a VBG, said VBG having an adjustable narrow-band wavelength as a reflector of said resonant cavity; and
   a temperature controlled furnace, said temperature controlled furnace controlling a temperature of said VBG,
   wherein said second reflector is further doped with a crystal of neodymium doped yttrium aluminum garnet (Nd: YAG).

2. The device according to claim 1, wherein said first reflector is coated with a reflective film.

3. The device according to claim 1, wherein said resonant cavity has a type selected from a group consisting of a linear type, a V type and a circle type.

4. The device according to claim 1, wherein said VBG has a material of PTR glasses in said VBG.

5. The device according to claim 1, wherein said VBG has a wavelength selectivity and an angle selectivity.

6. The device according to claim 1, wherein said VBG has a reflective wavelength controlled in a way selected from a group consisting of a thermal modulation and an angle adjustment.

7. The device according to claim 6, wherein said thermal modulation is obtained through a thermal expansion coefficient of said VBG.

* * * * *